United States Patent [19]

Gillberg-LaForce et al.

[11] Patent Number: 4,937,017
[45] Date of Patent: Jun. 26, 1990

[54] NONLINEAR OPTICALLY RESPONSIVE INORGANIC-ORGANIC COMPOSITE COMPOSITIONS

[75] Inventors: Gunilla E. Gillberg-LaForce, Summit; Thomas M. Leslie, Clinton Township, Hunterdon County; Tessie M. Che, Westfield; Marie Borzo, Basking Ridge, all of N.J.

[73] Assignee: Hoechst Celanese Corp., Somerville, N.J.

[21] Appl. No.: 385,460

[22] Filed: Jul. 27, 1989

Related U.S. Application Data

[62] Division of Ser. No. 87,493, Aug. 20, 1987, Pat. No. 4,885,113.

[51] Int. Cl.$^5$ .......................... F21V 9/00; G02B 5/02; G02C 7/10; G03B 11/00
[52] U.S. Cl. ............................... 252/582; 252/589; 252/600; 428/68; 428/70; 428/305.5; 428/310.5; 428/314.2; 428/314.8; 428/315.5; 428/315.7; 350/1.1; 350/355; 350/356
[58] Field of Search ........... 252/582, 587, 589, 299.01; 350/1.1, 355, 356; 428/1, 68, 70, 305.5, 310.5, 314.2, 314.8, 315.5, 315.7

[56] References Cited

U.S. PATENT DOCUMENTS

| | | | |
|---|---|---|---|
| 4,694,066 | 9/1987 | DeMartino | 528/373 |
| 4,765,818 | 8/1988 | Che | 65/18.1 |
| 4,766,171 | 8/1988 | DeMartino | 524/722 |
| 4,795,664 | 1/1989 | DeMartino | 428/1 |
| 4,810,674 | 3/1989 | Che et al. | 252/299.01 X |
| 4,814,211 | 3/1989 | Buckley et al. | 428/1 |
| 4,818,898 | 4/1989 | Anderson et al. | 252/582 X |
| 4,828,758 | 5/1989 | Gillberg-LaForce | 252/582 |
| 4,851,270 | 7/1989 | Che et al. | 428/1 |

Primary Examiner—Matthew A. Thexton
Assistant Examiner—Philip Tucker
Attorney, Agent, or Firm—Depaoli & O'Brien

[57] ABSTRACT

This invention provides a nonlinear optical medium which is a composite of a microporous inorganic oxide glass which contains an incorporated solution of a solvent and an organic component which exhibits nonlinear optical response.

In one embodiment the solution incorporated in the microporous glass monolith is composed of dioxane and 4-N,N-dimethylamino-4'-nitrostilbene.

5 Claims, No Drawings

NONLINEAR OPTICALLY RESPONSIVE INORGANIC-ORGANIC COMPOSITE COMPOSITIONS

This invention was made with Government support under Contract No. F33615-85-5025 awarded by the Department of Defense (DOD). The Government has certain rights in this invention.

This is a division of application Ser. No. 087,493, now U.S. Pat. No. 4,885,113, filed Aug. 20, 1987.

CROSS-REFERENCE TO RELATED APPLICATIONS

The subject matter of this patent application is related to that disclosed in patent application Ser. No. 015,759, now Pat. No. 4,851,270 filed Feb. 7, 1987; which is incorporated herein by reference.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Nonlinear optical properties of organic and polymeric materials was the subject of a symposium sponsored by the ACS division of Polymer Chemistry at the 18th meeting of the American Chemical Society, Sept. 1982. Papers presented at the meeting are published in ACS Symposium Series 233, American Chemical Society, Washington, D.C. 1983.

The above-recited publications are incorporated herein by reference.

Of related interest with respect to the present invention are publications which describe the production of inorganic-organic composites such as J. Phys. Chem., 88, 5956 (1984) and J. Non-Cryst. Solids, 74, 395 (1985) by D. Avnir et al, and Mat. Res. Soc. Symp. Proc., 73, 809 (1986) by Pope et al; incorporated herein by reference.

There is continuing research effort to develop new nonlinear optical systems for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide novel nonlinear optical media.

It is another object of this invention to provide a transparent optical medium which is a composite of a microporous inorganic oxide glass and an incorporated solution containing an organic component which exhibits nonlinear optical response.

It is a further object of this invention to provide optical devices which contain a novel nonlinear optical element.

Other objects and advantages of the present invention shall become apparent from the accompanying description and examples.

DESCRIPTION OF THE INVENTION

One or more objects of the present invention are accomplished by the provision of an optical medium consisting of a composite composition of an inorganic oxide glass monolith with a microporous structure containing an incorporated solution comprising a solvent component and an organic component which exhibits nonlinear optical response, and wherein the glass monolith has sealed outer surfaces.

The glass monolith typically is comprised of silica either alone or in combination with up to about 20 weight percent of one or more other inorganic oxides of elements such as lithium, sodium, potassium, rubidium, cesium, magnesium, calcium, strontium, barium, titanium, zirconium, vanadium, tantalum, chromium, molybdenum, tungsten, manganese, iron, nickel, cobalt, copper, zinc, cadmium, boron, aluminum, phosphorus, gallium, germanium, tin, arsenic, antimony, bismuth, selenium, and the like.

A present invention glass monolith microporous structure nominally has a pore volume between about 10–80 percent of the total volume, and has pore diameters in the range between about 15–2000 angstroms. The average pore diameter typically is in the range between about 50–300 angstroms.

A glass monolith can be in the form of thin coatings on transparent or reflective substrates; films; plates; cubes; cylinders; prisms; fibers; and the like.

The incorporated solution can occupy between about 1–99 percent of the microporous volume of the glass monolith, and usually it occupies between about 5–95 percent of the microporous volume.

The solution can be homogeneously distributed throughout the microporous volume. In another embodiment the solution is concentrated in a zone of the microporous structure which is adjacent to a surface of the glass monolith. As an alternative, the glass monolith can have microporosity in one or more zones, and the microporous volume of a zone contains incorporated solution.

In another embodiment the content of the nonlinear optically active organic solution has a gradient distribution in the microporous structure of an invention glass monolith.

In another embodiment this invention provides a transparent optical medium which is coated on a transparent or reflective substrate, wherein the optical medium is a composite composition comprising an inorganic oxide glass monolith with a microporous structure containing an incorporated solution comprising a solvent component and an organic component which exhibits nonlinear optical response, and wherein the glass monolith has sealed outer surfaces.

In another embodiment this invention provides a transparent optical medium which is in the form of a thin sheet having a thickness less than about 2 millimeters and which has each side surface seal-coated with a transparent electrically conductive film, wherein the optical medium is a composite composition consisting of an inorganic oxide glass monolith with a microporous structure containing an incorporated solution comprising a solvent component and an organic component which exhibits nonlinear optical response.

In another embodiment this invention provides an optical light switch or light modulator device with an optical medium element comprising a composite composition consisting of an inorganic oxide glass monolith with a microporous structure containing an incorporated solution comprising a solvent component and an organic component which exhibits nonlinear optical response, and wherein the glass monolith has sealed outer surfaces.

A present invention nonlinear optical medium can have a nonlinear optically active organic component which is characterized by an external field-induced orientation of aligned molecules.

In a further embodiment this invention provides a process for switching or modulating light transmission which comprises introducing an incident fundamental light frequency into a transparent optical medium which is comprised of a composite composition consisting of an inorganic oxide glass monolith with a microporous structure containing an incorporated solution comprising a solvent component and an organic component which exhibits nonlinear optical response.

A present invention nonlinear optical medium which is noncentrosymmetric can exhibit a second order nonlinear optical susceptibility $\chi^{(2)}$ of at least about $1 \times 10^{-6}$ esu as measured at 1.91 μm excitation wavelength.

A present invention nonlinear optical medium which is centrosymmetric can exhibit a third order nonlinear optical susceptibility $\chi^{(3)}$ of at least about $1 \times 10^{-9}$ esu as measured at 1.91 μm excitation wavelength.

The term "solution" as employed herein refers to a solvent medium which is fluid at ambient temperatures, and which contains a dissolved organic component which exhibits nonlinear optical response.

The term "sealed" as employed herein refers to the outer surfaces of a glass monolith which are nonporous with respect to the organic components of the solution which is incorporated in an invention composite composition. The sealant on the outer surface boundary can be an organic or inorganic coating or other substrate which effectively prevents the migration of solution components out of an invention composite composition.

The term "external field" as employed herein refers to an electric, magnetic or mechanical stress field which is applied to a substrate of mobile organic molecules, to induce dipolar alignment of the molecules parallel to the field.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

There are important advantages in utilizing a solution which exhibits nonlinear optical response rather than a corresponding organic solid phase, as an incorporated medium in an invention composite composition.

A solution flows readily at room temperature, which facilitates the incorporation of the solution medium into the microporous structure of a glass monolith.

A particularly significant advantage of an incorporated solution medium is the ease with which the nonlinear optically active molecules can be oriented in an externally applied electric or magnetic field at ambient temperatures. The molecular orientation is characterized by a fast switching time. A corresponding incorporated solid organic medium must be heated to the melt phase before achieving external field-induced molecular orientation of the nonlinear optically active molecules, and the switching time is relatively slow.

An incorporated solution medium also tends to exhibit an enhanced nonlinear optical susceptibility, which may be attributable to a shielding effect by the solvent component of internal local fields in the nonlinear optically active molecules. (Neal et al, Proceedings Of The Sixth IEEE, ISAF 1986, pages 89–92).

A present invention composite composition has excellent optical clarity under a broad range of conditions. A composite composition which has an incorporated organic solid phase will have some degree of opacity unless the refractive indicies of the glass monolith and the incorporated organic components are closely matched.

A present invention composite composition has the structural strength and other advantages of a solid matrix, while providing the superior optical properties of a liquid phase nonlinear optical medium.

PREPARATION OF POROUS INORGANIC OXIDE GLASS MONOLITHS

The various methods for the manufacture of porous glass are reviewed in U.S. Pat. No. 4,528,010. The methods include the Vycor (Corning), chemical vapor deposition, white carbon, colloid silica, and silica gel procedures.

One method of producing a porous glass body involves (1) forming an article of desired shape from a parent borosilicate glass; (2) thermally treating the glass article at a temperature of 500°–600° C. to separate the glass into a silica-rich phase and a silica-poor phase; (3) dissolving or leaching the silica-poor phase with acid to provide a porous structure composed of the silica-rich phase; and (4) washing to remove leaching residue, and then drying.

Embodiments for production of porous inorganic oxide glass monoliths by leaching of a soluble phase from a solid glass structure are described in U.S. Pat. Nos. 2,106,744; 2,286,275; 2,303,756; 2,315,328; 2,480,672; 3,459,522; 3,843,341; 4,110,093; 4,112,032; 4,236,930; 4,588,540; and references cited therein; incorporated herein by reference.

U.S. Pat. No. 4,584,280 describes a process for preparing a transparent porous ceramic film which involves applying an anhydrous solution containing an organometallic compound and a multifunctional organic compound to a substrate; and then thermally decomposing the organic compounds.

A more recent development is the "sol-gel" process for preparation of porous monolithic glasses and ceramics at moderate temperatures. The sol-gel procedure involves the formation of a three-dimensional network of metal oxide bonds at room temperature by a hydrolysis-condensation polymerization reaction of metal alkoxides, followed by low temperature dehydration. The resultant porous glass structure optionally can be sintered at elevated temperatures.

In another embodiment this invention provides a process for producing a composite composition comprising a homogeneous inorganic oxide glass monolith with a microporous structure containing an organic component which exhibits nonlinear optical response, which comprises (1) hydrolyzing tetraalkoxysilane under acidic or basic pH conditions in a sol-gel reaction medium comprising water and a water-miscible organic solvent component until gellation of the reaction medium is completed; (2) removing the solvent medium to provide a porous glass monolith; (3) impregnating the porous glass monolith with an organic solution which exhibits nonlinear optical response; and (4) sealing the glass monolith outer surfaces.

The term "homogeneous" as employed herein with reference to a porous glass monolith means that the inorganic oxide composition and the microstructure are substantially invariant throughout the monolith.

Embodiments for production of porous inorganic oxide glass monoliths by the sol-gel process are described in U.S. Pat. Nos. 3,640,093; 3,678,144; 3,681,113; 3,811,918; 3,816,163; 3,827,893; 3,941,719; 4,327,065; 4,389,233; 4,397,666; 4,426,216; 4,432,956; 4,472,510; 4,477,580; 4,528,010; 4,574,063; and references cited therein; incorporated herein by reference. Mat. Res. Soc. Symp. Proc., 73, 35 (1986) by Hench et al describes the role of chemical additives in sol-gel processing; incorporated herein by reference.

Illustrative of water-miscible solvents employed in a sol-gel process embodiment are alkanols such as methanol and ethanol; ketones such as acetone and methyl ethyl ketone; esters such as methyl acetate and ethyl formate; ethers such as dioxane and tetrahydrofuran; amides such as dimethylformamide, dimethylacetamide and 1-methyl-2-pyrrolidinone; and the like.

Acidic pH conditions in the sol-gel process can be provided by the addition of mineral acids such as hydrochloric acid; and basic pH conditions can be provided by the addition of bases such as ammonium hydroxide.

Illustrative of tetraalkoxysilanes and other metal and metalloid alkoxides are methoxy and ethoxy derivatives of silicon, lithium, magnesium, titanium, manganese, aluminum, tin, antimony, and the like. Aryloxy derivatives also can be utilized in the sol-gel process.

Porous glass monoliths produced by a sol-gel process embodiment have an advantageous combination of properties, and generally have superior optical properties as compared to porous glass monoliths prepared by other techniques, e.g., by the leaching of a silica-poor phase from a borosilicate glass.

A sol-gel derived porous glass monolith is homogeneous, and the inorganic matrix can be obtained essentially free of inorganic or organic impurities, e.g., less than 2 weight percent of impurities.

A sol-gel derived porous glass monolith typically has a pore structure in which substantially all of the pores have diameters within about a 100 angstrom diameter variation range, e.g., within a range between about 50–150 or 300–400 or 900–1000 angstroms, as determined by sol-gel processing conditions.

A sol-gel derived porous glass monolith can have exceptional optical properties because the inorganic matrix is homogeneous in chemical composition and physical structure. Since there is minimized light scattering, the sol-gel derived porous glass monolith exhibits excellent optical transparency and light transmitting ability.

Solvent Component of the Solution

The solvent component of the solution incorporated in the microporous structure of the glass monolith is in a fluid state under operational conditions, e.g., 20°–30° C., and is selected to provide suitable solvating power with respect to the organic component which exhibits nonlinear optical response.

The solvent component can be a single solvent or a mixture of solvents. The solvent component also can exhibit nonlinear optical response, e.g., employing carbon disulfide as the solvent medium. In general all organic solvents exhibit some degree of third order nonlinear optical susceptibility.

Suitable organic solvents include aliphatic, alicyclic and aromatic media such as n-octane, cyclohexane, methylene chloride, trichloroethylene, carbon tetrachloride, dibutyl ether, dioxane, tetrahydrofuran, dimethylformamide, ethanol, butanol, acetone, diethylketone, acetonitrile, benzene, chlorobenzene, toluene, xylene, mesitylene, and the like. Water or a mixture of water with a miscible organic solvent also can be utilized when the aqueous medium is compatible with the organic nonlinear optically responsive component.

Nonlinear Optically Active Organic Component Of The Solution

The organic component of a present invention optical medium composite composition can be a small molecule or an oligomer or polymer which exhibits nonlinear optical response.

In another embodiment this invention provides a nonlinear optical medium consisting of a composite composition of a homogeneous inorganic glass monolith with a microporous structure containing an incorporated solution which comprises a solvent component and an organic component having a molecular weight less than about 1000 and exhibiting nonlinear optical response, and wherein the glass monolith has sealed outer surfaces.

Illustrative of known nonlinear optically active small molecule compounds suitable for the preparation of the optical composites are 4-nitroaniline, 2-methyl-4-nitroaniline, 4-N,N-dimethylamino-4'-nitrostilbene (DANS), and the like.

In another embodiment this invention provides a nonlinear optical medium consisting of a composite composition of a homogeneous inorganic oxide glass monolith with a microporous structure containing an incorporated solution which comprises a solvent component and a quinodimethane component corresponding to the formula:

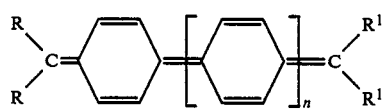

where R and R$^1$ are substituents selected from hydrogen and aliphatic, alicyclic and aromatic groups containing between about 1-20 carbon atoms; n is an integer with a value between about 0-2; and at least one of the R substituents is an electron-donating group, and at least one of the R$^1$ substituents is an electron-withdrawing group; and wherein the glass monolith has sealed outer surfaces.

Illustrative of quinodimethane compounds corresponding to the above formula are 13,13-diamino-14,14-dicyanodiphenoquinodimethane; 13,13-di(dimethylamino)-14,14-dicyanodiphenoquinodimethane; 13,13-di(diethylamino)-14,14-dicyanodiphenoquinodimethane; 13,13-di(n-hexadecylamino)-14,14-dicyanodiphenoquinodimethane; 13,13-ethylenediamino-14,14-dicyanodiphenoquinodimethane; and the like.

In another embodiment this invention provides a nonlinear optical medium consisting of a composite composition of a homogeneous inorganic oxide glass monolith with a microporous structure containing an incorporated solution which comprises an organic solvent component and a quinodimethane component corresponding to the formula:

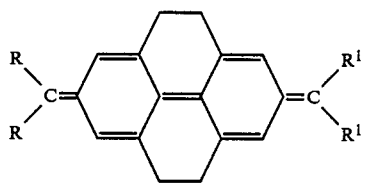

where R and R¹ are substituents selected from hydrogen and aliphatic, alicyclic and aromatic groups containing between about 1-20 carbon atoms; and at least one of the R substituents is an electron-donating group, and at least one of the R¹ substituents is an electron-withdrawing group; and wherein the glass monolith has sealed outer surfaces.

Illustrative of quinodimethane compounds corresponding to the above formula are 13,13-ethylenediamino-14,14-dicyano-4,5,9,10-tetrahydropyrenoquinodimethane; 13,13-diamino-14,14-dicyano-4,5,9,10-tetrahydropyrenoquinodimethane; 13,13-di(dimethylamino)-14,14-dicyano-4,5,9,10-tetrahydropyrenoquinodimethane; 13,13-di(diethylamino)-14,14-dicyano-4,5,9,10-tetrahydropyrenoquinodimethane; 13,13-di(n-hexadecylamino)-14,14-dicyano-4,5,9,10-tetrahydropyrenoquinodimethane; and the like.

The synthesis of quinodimethane type compounds corresponding to the above illustrated formulae are described in U.S. Pat. Nos. 4,640,800 and 4,659,177.

In another embodiment this invention provides a composite composition of a homogeneous inorganic oxide glass monolith with a microporous structure containing an incorporated solution which comprises an organic solvent component and a quinodimethane component corresponding to the formula:

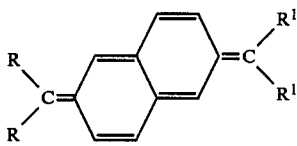

where R and R¹ are substituents selected from hydrogen and aliphatic, alicyclic and aromatic groups containing between about 1-20 carbon atoms, and at least one of the R substituents is an electron-donating group, and at least one of the R¹ substituents is an electron-withdrawing group; and wherein the glass monolith has sealed outer surfaces.

Illustrative of quinodimethane compounds corresponding to the above formula are 11,11-diamino-12,12-dicyano-2,6-naphthoquinodimethane; 11,11-di(dimethylamino)-12,12-dicyano-2,6-naphthoquinodimethane; 11,11-di(n-butylamino)-12,12-dicyano-2,6-naphthoquinodimethane; 11,11-di(n-hexadecylamino)-12,12-dicyano-2,6-naphthoquinodimethane; and the like.

The synthesis of naphthoquinodimethane compounds corresponding to the above illustrated formula is described in copending patent application Ser. No. 864,203, filed May 19, 1986; incorporated herein by reference.

In another embodiment this invention provides a nonlinear optical medium consisting of a composite composition of a homogeneous inorganic glass monolith with a microporous structure containing an incorporated solution comprising a solvent component and a thermoplastic polymer component exhibiting nonlinear optical response, and wherein the glass monolith has sealed outer surfaces.

In another embodiment this invention provides a nonlinear optical medium consisting of a composite composition of a homogeneous inorganic glass monolith with a microporous structure containing an incorporated solution comprising a solvent component and a thermoplastic polymer component which is characterized by a recurring monomeric unit corresponding to the formula:

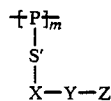

where P is a polymer main chain unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

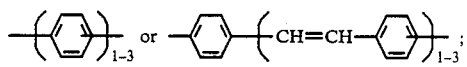

and Z is an electron-donating group or an electron-withdrawing group; and wherein the glass monolith has sealed outer surfaces.

The main chain of the polymer in the above-illustrated formulae can be structures such as polyvinyl, polysiloxane, polyoxyalkylene, polyamide, polyester, and the like.

The term "electron-donating" as employed herein refers to substituents which contribute electron density to the π system when the conjugated electronic structure is polarized by the input of electromagnetic energy.

The term "electron-withdrawing" as employed herein refers to electronegative substituents which attract electron density from the π system when the conjugated electronic structure is polarized by the input of electromagnetic energy.

Illustrative of electron-donating substituents are amino, alkyl, alkoxy, alkylthio, hydroxy, thiolo, acyloxy, vinyl, halo, and the like.

Illustrative of electron-withdrawing substituents are nitro, haloalkyl, cyano, acyl, alkanoyloxy, alkoxysulfonyl, and the like.

In another embodiment this invention provides a nonlinear optical medium consisting of a composite composition of a homogeneous inorganic glass monolith with a microporous structure containing an incorporated solution comprising a solvent component and a thermoplastic polymer component which is characterized by a recurring monomeric unit corresponding to the formula:

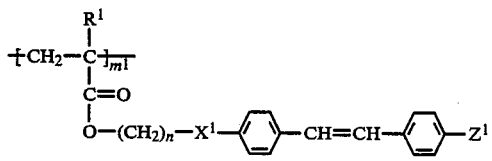

where $m^1$ is an integer of at least 5; n is an integer between about 2-20; $X^1$ is $-NR^1$, $-O-$ or $-S-$; $R^1$ is hydrogen or methyl; and $Z^1$ is $-NO_2$, $-CN$ or $-CF_3$; and wherein the glass monolith has sealed outer surfaces.

The synthesis of pendant side chain polymers corresponding to the above formulae is described in copending patent application Ser. No. 822,090, filed Jan. 24, 1986; incorporated herein by reference.

For the purpose of preparing a present invention solution, a nonlinear optically active compound such as p-nitroaniline is dissolved in a suitable solvent such as dioxane. The solute component can comprise between 10–80 weight percent of the solution medium.

A present invention composite composition can be prepared by immersing a microporous inorganic oxide glass monolith in a volume of solution which is to be incorporated. The solution impregnates the microporous structure by capillary action.

Another aspect of composite composition preparation involves sealing the outer surfaces of the glass monolith structure to prevent the migration or vaporization of any of the incorporated solution components out of the glass monolith surface micropores.

In one method a glass monolith containing the incorporated solution is sealed with a coating or film of a thermoplastic polymer, such as by dipping or spraying with an organic solution of the polymer. Suitable polymers for this purpose include poly(methyl methacrylate), polyvinyl acetate, polyvinyl chloride, polyurethane, polyethylene, hydroxyethylcellulose, and the like.

Inorganic materials also can be utilized as a surface sealant, such as a transparent metal coating or a nonporous sol-gel coating.

When a present invention composite composition is in the form of a coating or thin film on a nonporous substrate, then a sealant is required only for the exposed surface of the composite coating or film not in contact with and sealed by the substrate.

A present invention composite composition also can have sealed outer surfaces when it is an intermediate thin sheet between laminating layers such as electrically conductive films.

Nonlinear Optical Properties

The fundamental concepts of nonlinear optics and their relationship to chemical structures can be expressed in terms of dipolar approximation with respect to the polarization induced in an atom or molecule by an external field.

As summarized in the ACS Symposium series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a crystalline domain:

$$\Delta\mu = \mu_e - \mu_g = \alpha E + \beta EE + \gamma EEE + \quad (1)$$

$$P = P_O + \chi^{(1)}E + \chi^{(2)}EE + \chi^{(3)}EEE + \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave.

A present invention nonlinear optical medium typically is optically transparent and exhibits hyperpolarization tensor properties such as third harmonic generation.

These theoretical considerations are elaborated by Garito et al in chapter 1 of the ACS Symposium Series 233 (1983); and by Lipscomb et al in J. Chem., Phys., 75, 1509 (1981), incorporated herein by reference. See also Lalama et al, Phys. Rev., A20, 1179 (1979); and Garito et al, Mol., Cryst. and Liq. Cryst., 106, 219 (1984); incorporated herein by reference.

External Field Induced Molecular Orientation

The microscopic response, or electronic susceptibility $\beta$, and its frequency dependence or dispersion, is experimentally determined by electric field-induced second harmonic generation (DCSHG) measurements of liquid solutions or gases as described in "Dispersion Of The Nonlinear Second Order Optical Susceptibility Of Organic Systems", Physical Review B, 28 (No. 12), 6766 (1983) by Garito et al, and the Molecular Crystals and Liquid Crystals publication cited above.

In the measurements, the created frequency $\omega_3$ is the second harmonic frequency designated by $2\omega$, and the fundamental frequencies $\omega_1$ and $\omega_2$ are the same frequency designated by $\omega$. An applied DC field removes the natural center of inversion measured using the wedge Maker fringe method. The measured polarization at the second harmonic frequency $2\omega$ yields the effective second harmonic susceptibility of the liquid solution and thus the microscopic susceptibility $\beta$ for the molecule.

The present invention optical media preferably contain an organic component which exhibits an extremely large β value. Illustrative of this preferred type of organic component is 13,13-diamino-14,14-dicyanodiphenoquinodimethane (DCNDQA):

The DCNDQA molecule is characterized by a single excited state at 2.2 eV(0.6); a dipole moment difference of $\Delta\mu^x$:23D; a transition moment of $\mu^x{}_{1g}$:13.6D; and large $2\omega$ and $\omega$ contributions to $\beta$ of order $10^3$ at $1\mu$–$0.6\mu$, and no interfering $2\omega$ resonance from higher excitations.

A DCNDQA type of diphenoquinodimethane conjugated structure exhibits nonlinear optical responses which are 2–3 orders of magnitude greater than those of a chemical structure such as 2-methyl-4-nitroaniline.

With respect to macroscopic optical effects, if the distribution of nonlinear optically active organic molecules in a present optical medium is random, there is orientational averaging by statistical alignment of the dipolar molecules and the optical medium exhibits third order nonlinearity ($\chi^{(3)}$).

If the distribution of nonlinear optically active organic molecules in the optical medium is at least partially uniaxial in molecular orientation, then the optical medium exhibits second order nonlinearity ($\chi^{(2)}$) One method for preparing optical media with large second-order nonlinear by application of an external DC electric field to the organic molecules in solution. The poling provides the alignment predicted by the Boltzmann distribution law.

The uniaxial molecular orientation of the nonlinear optically active organic molecules in a a present invention optical medium can be confirmed by X-ray diffraction analysis. Another method of molecular orientation measurement is by optical characterization, such as optical absorption measurements by means of a spectrophotometer with a linear polarization fixture.

The following examples are further illustrative of the present invention. The components and specific ingredients are presented as being typical, and various modifications can be derived in view of the foregoing disclosure within the scope of the invention.

EXAMPLE I A section of porous glass (3 cm×3 cm×3 mm) of 50–60 angstroms average pore diameter is submerged for one hour in a chlorobenzene solution containing 30% by weight of 2-methyl-4-nitroaniline for one hour.

The impregnated glass section is withdrawn from the solution and air dried to remove the benzene solvent from the surface of the porous glass structure. The porous glass product is transparent.

The porous glass product is film coated with poly(-methyl methacrylate) by dipping the porous glass which is filled with 2-methyl-4-nitroaniline and chlorobenzene into a methyl ethyl ketone solution of poly(-methyl methacrylate) and then air drying.

The above procedure is repeated, except that the impregnated porous glass is coated on both side surfaces with transparent electrically conductive indium-tin oxide to form electrode layers.

The inorganic-organic composite optical medium exhibits third order nonlinear optical susceptibility $\chi^{(3)}$ of about $2\times10^{-9}$ esu as measured at 1.91 μm excitation wavelength.

The electrode layers of the optical medium described above are attached to a DC power supply, and about $1\times10^5$ V/cm is applied. The optical medium exhibits second order linear susceptibility $\chi^{(2)}$ of about $1\times10^{-6}$ esu as measured at 1.91 μm excitation wavelength.

EXAMPLE II

A starting solution for the production of thin films is prepared by admixing 50 ml of ethanol, 50 ml of dioxane, 10 ml of tetramethoxysilane, 5 ml of 0.01 N HCl, 3 g of Triton® X-100[(1)] and 0.1 g of 7,7-di(methylamino)-8,8-dicyanoquinodimethane. The solution is allowed to stand for two hours at room temperature.
[(1)] Surfactant; Rohm & Haas Company.

Glass slides are dipped into the solution, and then air dried The resultant transparent film coating is a porous silicate monolith containing a pore volume with a content of solvent and quinodimethane components.

In an alternative procedure, the quinodimethane component is not included in the film preparation solution. After glass slides are coated with porous silicate film, the glass slides are dipped into a dimethylformamide solution of quinodimethane component to impregnate the porous film coating with the solution. After glass slides are air dried to remove the surface solvent, the resultant composite coating on the glass slides is a transparent silicate film with a microporous structure containing incorporated benzene and quinodimethane components.

The two procedures are repeated, except that the quinodimethane component is 13,13-diamino-14,14-dicyanodiphenoquinodimethane or 11,11-di(-dibutylamino)-12,12-dicyano-2,6-naphthoquinodimethane.

The glass monolith surfaces are sealed in accordance with a procedure described in Example·I.

The inorganic-organic composite optical media exhibit third-order nonlinear optical susceptibility $\chi^{(3)}$. The optical media exhibit second-order nonlinear optical susceptibility $\chi^{(2)}$ when the quinodimethane component in each optical medium has an external field induced orientation of aligned molecules.

EXAMPLE III

A transparent porous ceramic thin film is prepared in accordance with the procedure described in U.S. Pat. No. 4,584,280.

A 50 g quantity of tetraethoxysilane is dissolved in 100 g of isopropanol, and 20 g of ethanol containing 2% of 1% aqueous hydrochloric acid solution is added dropwise with stirring. This is followed by the addition of 20 g of ethanol containing 3% hydroxyethylcellulose, and the mixture is refluxed for 15 minutes with stirring to provide a clear viscous solution.

The solution is spread on the surface of a thin stainless steel plate and dried at room temperature. The coated plate is heated in a muffle furnace at a rate of 5° C./min, and maintained at 500° C. for one hour. After gradual cooling of the plate, a transparent thin film of silicate is evident on the stainless steel surface. The average pore size is in the range of 60–80 angstroms.

The coated plate is dipped into a 20% dioxane solution of poly[6-(4-nitrobiphenyloxy)ethyl methacrylate]. The coated plate is air dried to remove the dioxane solvent from the porous silicate film surface. The resultant porous silicate film has a content of incorporated nonlinear optically active polymer and dioxane.

An acetone solution of polyurethane is sprayed on the silicate film surface, and the coating is air dried. The procedure is repeated until the surface pores of the silicate film are sealed.

EXAMPLE IV

A.

A porous glass plate (10 cm×10 cm×1 cm) of 100–120 angstroms average pore diameter is set in a shallow pan containing a 20% toluene solution of 4-dimethylamino-4'-nitrostilbene. The one centimeter sides of the glass plate simultaneously are submerged to a depth of 3 millimeters. After 2 minutes of immersion in the solution, the glass plate is withdrawn and air dried. The resultant porous glass plate product has a 4-dimethylamino-4'-nitrostilbene content which is concentrated in a zone of the microporous structure which is adjacent to one flat surface of the glass plate.

A similar product is obtained if the glass plate has porosity only in a narrow zone adjacent to one of the glass plate surfaces, and the pore volume is impregnated with a solution of nonlinear optically active compound.

The glass monolith surfaces are sealed in accordance with a procedure described in Example I.

B.

A porous glass plate (6 cm×6 cm×2 cm) of 80–100 angstroms average pore diameter is set in a shallow pan containing a 30% toluene solution of a graft polymer prepared by the reaction of polymethylhydrosiloxane (average M.W., 500–2000) with 4-penteneoxy-4'-nitrophenyl. The two centimeter sides of the glass plate simultaneously are submerged to a depth of 2 millimeters.

After 20 minutes of immersion in the solution, the glass plate is withdrawn and air dried to remove the toluene solvent from the glass surface.

The resultant porous glass plate product has a solution content which has a gradient distribution in the microporous structure, from dense near one flat surface to less dense near the opposite flat surface. The gradient distribution is the effect of solution capillary action in the interconnected microporous structure during the impregnation procedure.

The preparation of the nonlinear optical medium is repeated, except that the graft polymer is one prepared by the reaction of 4-N,N-dimethylamino-4'-nitrodiphenylacetylene with polymethylhydrosiloxane (1.83 hydrogen equivalents).

The glass monolith surfaces are sealed in accordance with a procedure described in Example I.

C.

A porous glass plate (10 cm×10 cm×1 cm) of 50–60 angstroms average pore diameter is immersed in a large glass jar containing a solution of methyl methacrylate and a catalytic amount of free radical initiator. The jar is sealed and maintained at 38° C. to induce slow polymerization of the methyl methacrylate around and within the porous glass plate. After a two day polymerization period, the inorganic-organic composite is trimmed to remove the excess poly(methyl methacrylate) from the outer surfaces of the glass structure.

The composite plate then is set in a shallow pan containing toluene. The one centimeter sides of the glass plate simultaneously are submerged to a depth of 3 millimeters. After 2 hours of immersion in the toluene solution, the glass plate is removed and air dried. The resultant plate has porosity only in a narrow zone adjacent to one of the glass plate surfaces. The pore volume is impregnated with a solution of nonlinear optically active compound and the surfaces are sealed following the previously described procedures.

EXAMPLE V

A.

A three liter three-neck round bottom flask equipped with a mechanical stirrer is charged with one liter of acetonitrile and anhydrous potassium carbonate (152 g, 1 mole). A condenser is set in one of the necks and the other neck of the flask is equipped with a gas inlet tube, and the flask solution is degassed with argon. n-Octyl thiol (146 g, 1 mole) and 4-fluorobenzaldehyde (124 g, 1 mole) are added to the solution. After 0.5 g of 18-crown-6 ether is added to the flask, the reaction medium is stirred at reflux for 7 hours.

The resultant product mixture is cooled, then 2000 ml of water are added and the water-acetonitrile solution is extracted three times with hexane. The hexane layers are combined and dried over anhydrous magnesium sulfate. After the hexane solvent is removed, the residual crude product mixture is vacuum distilled, and 4-n-octylthiobenzaldehyde product is obtained at 149° C. (0.6 torr).

B.

A one liter two-neck flask equipped with a mechanical stirrer is charged with 4-nitrophenylacetic acid (90.5 g, 0.5 mole). The stirring action is commenced, and piperidine (46 g, 0.55 mole) is added dropwise. Heat is applied to the flask, and when the reaction medium begins to turn pink, 4-n-octylthiobenzaldehyde (125 g, 0.5 mole) is added. The reaction mixture is heated at 120° C. for 7 hours. At the end of this period, the reaction mixture is poured into a two liter volume of cold ethanol. The resultant yellow precipitate is collected, and recrystallized from ethanol to provide liquid crystalline 4-nitro-4'-octylthiostilbene, melting at 53° C. and clearing at 72° C.

C.

4-Nitro-4'-octylthiostilbene is dissolved in N-methylpyrrolidone to form a 50% solution.

Following the procedures previously described, a porous glass plate is impregnated with the prepared solution, and the glass plate surfaces are sealed with a polymer coating.

What is claimed is:

1. A process for switching or modulating light transmission which comprises introducing an incident fundamental light frequency into a transparent optical medium which is comprised of a composite composition consisting of an inorganic oxide glass monolith with a microporous structure containing an incorporated solution comprising a solvent component and an organic component which exhibits nonlinear optical response, and the glass monolith microporous structure has pore diameters in the range between about 15–2000 angstroms, and all of the pore diameters are within about a 100 angstrom diameter variation range.

2. A process in accordance with claim 1 wherein the organic component is a thermoplastic polymer which is characterized by a recurring monomeric unit corresponding to the formula:

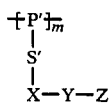

where P' is a polymer main chain unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

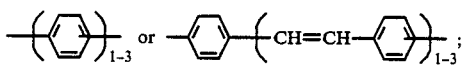

and Z is an electron-donating group or an electron-withdrawing group; and wherein the glass monolith has sealed outer surfaces, and the glass monolith microporous structure has pore diameters in the range between about 15-2000 angstroms, and all of the pore diameters are within about a 100 angstrom diameter variation range.

3. A process in accordance with claim 2 wherein the optical medium polymer is characterized by an external field-induced orientation of aligned polymer side chains.

4. A process in accordance with claim 1 wherein the organic component is a thermoplastic polymer which is characterized by a recurring monomeric unit corresponding to the formula:

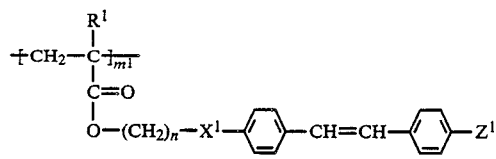

where $m^1$ is an integer of at least 5; n is an integer between about 2-20; $X^1$ is —$NR^1$, —O— or —S—; $R^1$ is hydrogen or methyl; and $Z^1$ is —$NO_2$, —CN or —$CF_3$; and wherein the glass monolith has sealed outer surfaces, and the glass monolith microporous structure has pore diameters in the range between about 15-2000 angstroms, and all of the pore diameters are within about a 100 angstrom diameter variation range.

5. A process in accordance with claim 4 wherein the optical medium polymer is characterized by an external field-induced orientation of aligned polymer side chains.

* * * * *